(12) United States Patent
Hansen et al.

(10) Patent No.: US 10,486,730 B2
(45) Date of Patent: Nov. 26, 2019

(54) STOWABLE VEHICLE INTERFACE (71) Applicant: Ford Global Technologies, LLC, Dearborn, MI (US)

(72) Inventors: Cheri Lyn Hansen, Canton, MI (US); Cynthia M. Neubecker, Westland, MI (US); Brad Alan Ignaczak, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 79 days.

(21) Appl. No.: 15/820,532

(22) Filed: Nov. 22, 2017

(65) Prior Publication Data
US 2019/0152505 A1  May 23, 2019

(51) Int. Cl.
| | |
|---|---|
| *B62D 1/183* | (2006.01) |
| *B60R 25/01* | (2013.01) |
| *B60R 7/04* | (2006.01) |
| *B60N 2/90* | (2018.01) |

(52) U.S. Cl.
CPC ............. *B62D 1/183* (2013.01); *B60R 7/043* (2013.01); *B60R 25/01* (2013.01); *B60N 2002/905* (2018.02)

(58) Field of Classification Search
CPC .......... B62D 1/183; B60R 7/043; B60R 25/01
See application file for complete search history.

(56) References Cited

U.S. PATENT DOCUMENTS

| | | | |
|---|---|---|---|
| 9,333,983 B2 | 5/2016 | Lathrop et al. | |
| 9,630,644 B2 | 4/2017 | Soderlind | |
| 2004/0140145 A1* | 7/2004 | Chernoff | B60T 7/08 180/333 |
| 2009/0321171 A1* | 12/2009 | Hakansson | B62D 1/18 180/333 |
| 2016/0264021 A1 | 9/2016 | Gillett | |
| 2017/0029018 A1 | 2/2017 | Lubischer et al. | |
| 2017/0225570 A1 | 8/2017 | El Aile et al. | |
| 2017/0227960 A1 | 8/2017 | Joyce et al. | |

FOREIGN PATENT DOCUMENTS

CN 106627724 A 5/2017

* cited by examiner

*Primary Examiner* — Drew J Brown
(74) *Attorney, Agent, or Firm* — Frank A. MacKenzie; Bejin Bieneman PLC (57) ABSTRACT

A system includes a seat. The system includes a steering assembly including a support shaft and a user interface, the steering assembly movable between a first position and a second position. The steering assembly is disposed in front of the seat in the first position and below the seat in the second position.

20 Claims, 6 Drawing Sheets

STOWABLE VEHICLE INTERFACE

BACKGROUND

A computer may operate a vehicle in an autonomous mode, a semi-autonomous mode, or a non-autonomous mode. In the autonomous mode each of vehicle propulsion, braking, and steering may be controlled by the computer. In the semi-autonomous mode the computer may control one or two of vehicles propulsion, braking, and steering. In the non-autonomous mode, a human operator may control the vehicle propulsion, braking, and steering. Accordingly, the operator may, or may not, need to interact with certain user input systems, e.g., a steering wheel assembly.

DETAILED DESCRIPTION

A system includes a seat. The system includes a steering assembly including a support shaft and a user interface, the steering assembly movable between a first position and a second position. The steering assembly is disposed in front of the seat in the first position and below the seat in the second position.

The system may include a panel positioned relative to the seat and movable between a closed position in which the steering assembly is inhibited from moving from the second position to the first position and an open position in which the steering assembly is permitted to move from the second position to the first position.

The system may include a lock moveable between a locked state in which the panel is inhibited from moving from the closed position to the open position and an unlocked state in which the panel is permitted to move from the closed position to the open position.

The system may include a processor and a memory, the memory storing instructions executable by the processor to actuate the lock from the locked state to the unlocked state upon receiving a request to operate a vehicle in a manual mode.

The system may include a receiver located under the seat, the steering assembly in the first position may be supported by the receiver.

The receiver may be located at a vehicle inboard side of the seat.

The receiver may be in electrical communication with the steering assembly in the first position.

The seat may include a seat frame, and the receiver may be supported by the seat frame.

The system may include a lock moveable between a locked state in which disengagement of the steering assembly from the receiver is inhibited and an unlocked state in which disengagement of the steering assembly from the receiver is permitted.

The system may include a processor and a memory, the memory storing instructions executable by the processor to actuate the lock of the receiver to the locked state before operating a vehicle in a manual mode.

The system may include a processor and a memory, the memory storing instructions executable by the processor to operate a vehicle in a manual mode upon detecting that the steering assembly is in the first position.

The system may include a processor in wireless communication with the steering assembly, and a memory storing instructions executable by the processor to actuate a vehicle steering system in response to a command from the steering assembly.

The steering assembly may include a steering wheel and a sensor positioned to detect a steering angle of the steering wheel.

The steering assembly may include a steering wheel and a force feedback actuator coupled to the steering wheel.

The steering assembly may include a wiring harness disposed in the support shaft.

The steering assembly may include a throttle control interface.

The steering assembly may include a brake control interface.

The steering assembly may include a head unit supported by the support shaft, and a steering wheel supported by the head unit.

The steering wheel may be releasably secured to the head unit.

The support shaft may include a first elongated portion and a second elongated portion, and in the first position the first elongated portion may extend transverse to a longitudinal axis and a vertical axis and the second elongated portion may extend along a lateral axis.

With reference to the Figures, a stowable user interface system 20 for a vehicle 22 includes a seat 24. The system 20 includes a steering assembly 28 including a support shaft 30 and a user interface 32. The steering assembly 28 is movable between a first position and a second position. The steering assembly 28 is disposed in front of the seat 24 in the first position and below the seat 24 in the second position.

The system 20 provides an occupant of the vehicle 22 access to the steering assembly 28 in the first position, e.g., such that the occupant may interact with the user interface 32 to control the vehicle 22. The system 20 stows the steering assembly 28 in the second position, e.g., such that the occupant may have increased mobility within a passenger cabin 34 of the vehicle 22, such that the occupant may be restricted from interacting with the user interface 32, etc.

The vehicle 22 may be any passenger or commercial automobile such as a car, a truck, a sport utility vehicle, a crossover vehicle, a van, a minivan, a taxi, a bus, etc. The vehicle 22 may include a floor 36 and the passenger cabin 34. The vehicle 22 may define: a longitudinal axis A1, e.g., extending between a front and rear of the vehicle 22; a lateral axis A2, e.g., extending between a left side and a right side of the vehicle 22; and a vertical axis A3, e.g., extending between a top and a bottom of the vehicle 22. The longitudinal axis A1, the lateral axis A2, and the vertical axis A3 may be perpendicular to each other. The front, rear, top, bottom, left and rights sides, etc. are relative to an orientation of the operator of the vehicle 22, an orientation of controls for operating the vehicle 22, e.g., an instrument panel, a driving direction of the vehicle 22 when wheels of the vehicle 22 are all parallel with each other, etc. The vehicle 22 may define a centerline that bisects the vehicle 22, e.g., along the longitudinal axis A1.

The vehicle 22 may operate in an autonomous mode, a semi-autonomous mode, or a non-autonomous mode. In the autonomous mode each of a propulsion system 38, a brake system 40, and a steering system 42 of the vehicle 22 are controlled by a computer 44 (all shown in FIG. 9). In the semi-autonomous mode the computer 44 may control one or two of the propulsion system 38, the brake system 40, and/or the steering system 42. In the non-autonomous mode, a human operator may control the propulsion system 38, the brake system 40, and the steering system 42.

Figure 9:
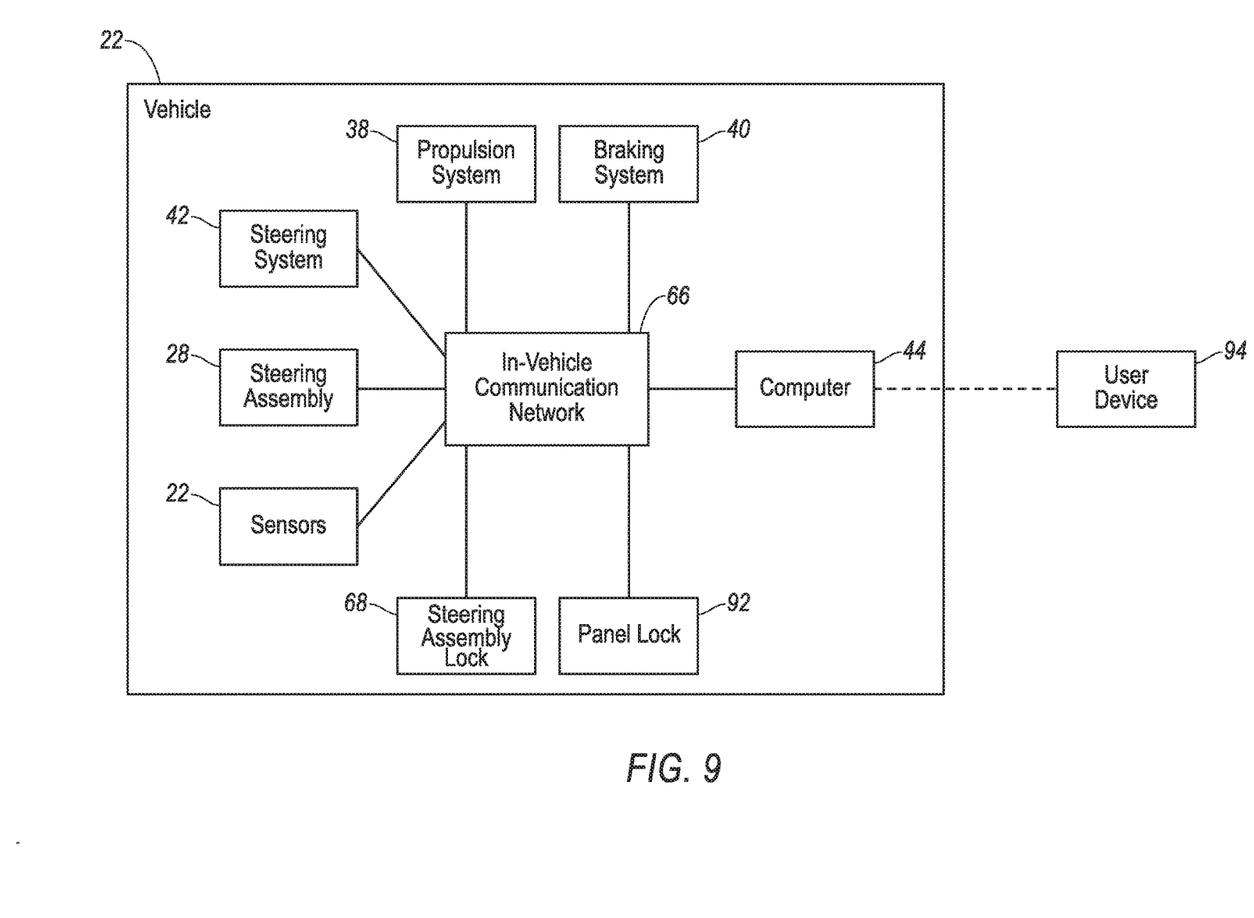
FIG. 9 is a block diagram of components of the vehicle.

The vehicle 22 may include a vehicle user interface 46, shown in FIG. 9. The vehicle user interface 46 presents information to and receives information from an occupant of the vehicle 22. The vehicle user interface 46 may be located, e.g., on an instrument panel in the passenger cabin 34 of the vehicle 22, or wherever may be readily seen by the occupant. The vehicle user interface 46 may include dials, digital readouts, screens, speakers, and so on for providing information to the occupant, e.g., human-machine interface (HMI) elements such as are known. The vehicle user interface 46 may include buttons, knobs, keypads, touchscreen, microphone, and so on for receiving information from the occupant.

The seat 24, shown in FIGS. 1-3 and 5-8, is a bucket seat, but alternatively the seat 24 may be a bench seat or another type of seat. The seat 24 may include a seat back 48, a seat bottom 50, and a headrest. The headrest may be supported by the seat back 48 and may be stationary or movable relative to the seat back 48. The seat back 48 may be supported by the seat bottom 50 and may be stationary or movable relative to the seat bottom 50. The seat bottom may include a seating surface 26. The seating surface 26, e.g., an exterior covering the seat 24, provides a reaction surface to support an occupant of the seat 24. The seat 24 may include a frame 52. The frame 52 may include tubes, beams, etc. The frame 52 may be formed of any suitable plastic material, e.g., carbon fiber reinforced plastic (CFRP), glass fiber-reinforced semi-finished thermoplastic composite (organosheet), etc. As another example, some or all components of the frame 52 may be formed of a suitable metal, e.g., steel, aluminum, etc. The seat 24 may be supported by the floor 36 of the vehicle 22, e.g., with the frame 52. A cavity 54 may be defined between the seat 24, e.g., the seat bottom 50, and the floor 36.

The seat 24 may have a vehicle inboard side 56 and a vehicle outboard side 58 spaced from each other. The vehicle inboard side 56 may be closer to the centerline of the vehicle 22, e.g., relative to the vehicle outboard side 58. To put it another way, a distance from the centerline to the vehicle inboard side 56 may be less than a distance from the centerline to the vehicle outboard side 58.

Figure 3:
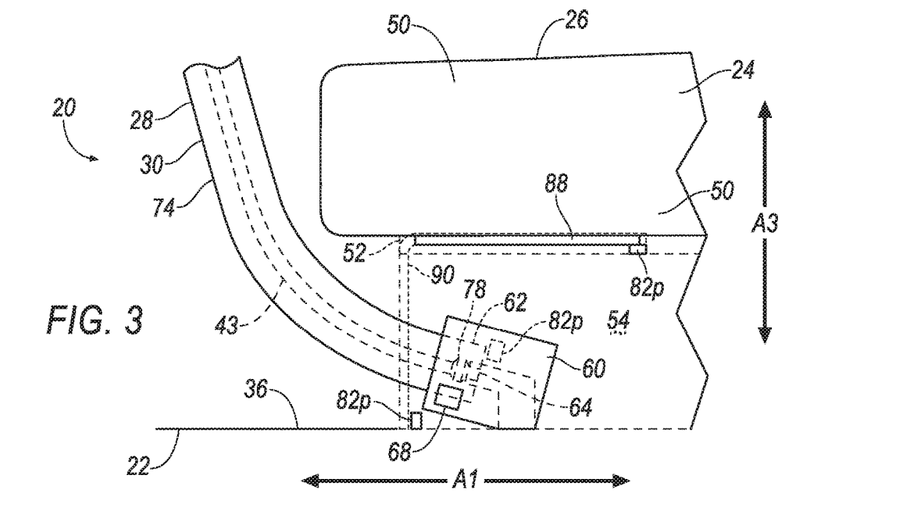
FIG. 3 is a magnified side view of a portion of the steering assembly in the first position.
Figure 6:
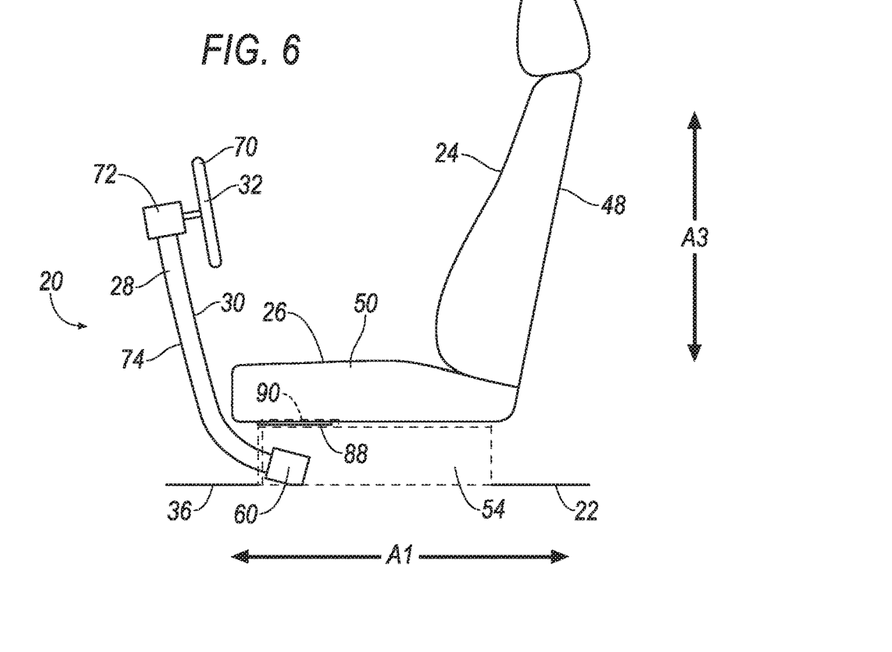
FIG. 6 is side view of the steering assembly in the first position.
Figure 8:
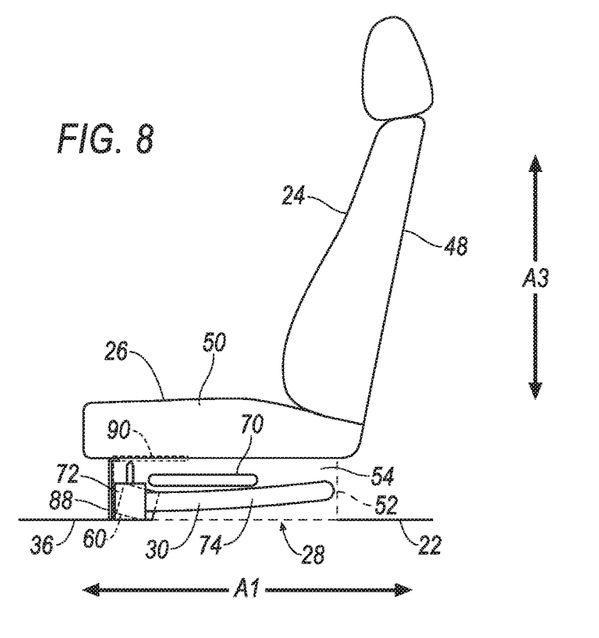
FIG. 8 is a side view of the steering assembly in the second position.

With reference to FIGS. 3, 6, and 8, the system 20 may include a receiver 60. The receiver 60 supports the steering assembly 28 in the first position. For example, the receiver 60 may define a passage 62, shown in FIG. 3. The support shaft 30 of the steering assembly 28 may engage with the passage 62. The passage 62 may be cylindrical, or any other suitable shape. The receiver 60 may include additional or alternative features to engage the steering assembly 28, e.g., groves, channels, holes, slots, clips, threads, etc.

The receiver 60 may be located under the seat 24, e.g., under the seating surface 26. For example, the receiver may be in the cavity 54. The receiver 60 may be supported by the seat 24 frame 52. For example, the receiver 60 may be fixed to the seat 24 frame 52 with one or more fasteners, clips, welds, etc. The receiver 60 may be supported by the floor 36 of the vehicle 22. For example, the receiver 60 may be fixed to the floor 36 with one or more fasteners, clips, welds, etc. The receiver 60 may be located at the vehicle 22 inboard side 56 of the seat 24. For example, the receiver 60 may be closer to the vehicle inboard side 56 of the seat 24 than to the vehicle outboard side 58 of the seat 24.

As shown in FIG. 3, the receiver 60 may include an electrical connector 64. The electrical connector 64 enables communicative connection of the steering assembly 28 with the vehicle computer 44, e.g., via an in-vehicle communication network 66. The electrical connector 64 may include pins, sockets, conductive pads, etc.

As shown in FIG. 3, the system 20 may include a lock 68. The lock 68 secures the steering assembly 28 in the first position. For example, the lock 68 may be moveable between a locked state in which disengagement of the steering assembly 28 from the receiver 60 is inhibited and an unlocked state in which disengagement of the steering assembly 28 from the receiver 60 is permitted. For example, the lock 68 may be secured to the receiver 60 and may include a latch that engages the support shaft 30 of the steering assembly 28 in the locked state. For example, the lock 68 may include a compression collar that tightens around the support shaft 30 in the locked stated. Additional or alternative features may be included in the lock 68 to provide the locked and unlocked states. The lock 68 may include circuits, chips, actuators, etc., designed to move the lock 68 from the locked state to the unlocked state, e.g., in response to a command from the computer 44. The lock 68 may transmit a message to the computer 44 indicating whether the lock 68 is in the locked state or the unlocked state.

The steering assembly 28 controls the steering system 42, e.g., by sending commands to the vehicle computer 44 to actuate the steering system 42, e.g., via the in-vehicle communication network 66. Similarly, the steering assembly 28 may control the propulsion system 38 and/or the brake system 40. The steering assembly 28 may include one or more computing devices, circuits, chips, antennas, etc.

With reference to FIGS. 3-6, the steering assembly 28 includes the support shaft 30. The support shaft 30 supports components of the steering assembly 28, e.g., one or more user interfaces 32, a steering wheel 70, a head unit 72, etc. The support shaft 30 may engage the receiver 60, e.g., when the steering assembly 28 is in the first position. The support shaft 30 may be cylindrical. The support shaft 30 may be hollow. The support shaft 30 may include a first elongated portion 74 and a second elongated portion 76. The first elongated portion 74 may be cylindrical and hollow. The second elongated portion 76 may be cylindrical and hollow. The first elongated portion 74 may be transverse to the second elongated portion 76. The first elongated portion 74 may be fixed to the second elongated portion 76, e.g., with a fastener, welding, adhesive, clip, etc. The first elongated portion 74 and the second elongated portion 76 may be monolithic, i.e., a single piece with no seams, joints, fasteners, or adhesives holding the first elongated portion 74 and the second elongated portion 76 together. The first elongated portion 74 may be pivotally secured to the second elongated portion 76, e.g., with a hinge or the like (not shown). The first elongated portion 74 may engage the receiver 60 while the steering assembly 28 is in the first position. The second elongated portion 76 may support other components of the steering assembly 28, e.g., the user interface 32, the head unit 72 etc. The support shaft 30 may be made of metal, plastic, or any suitable material.

Figure 4:
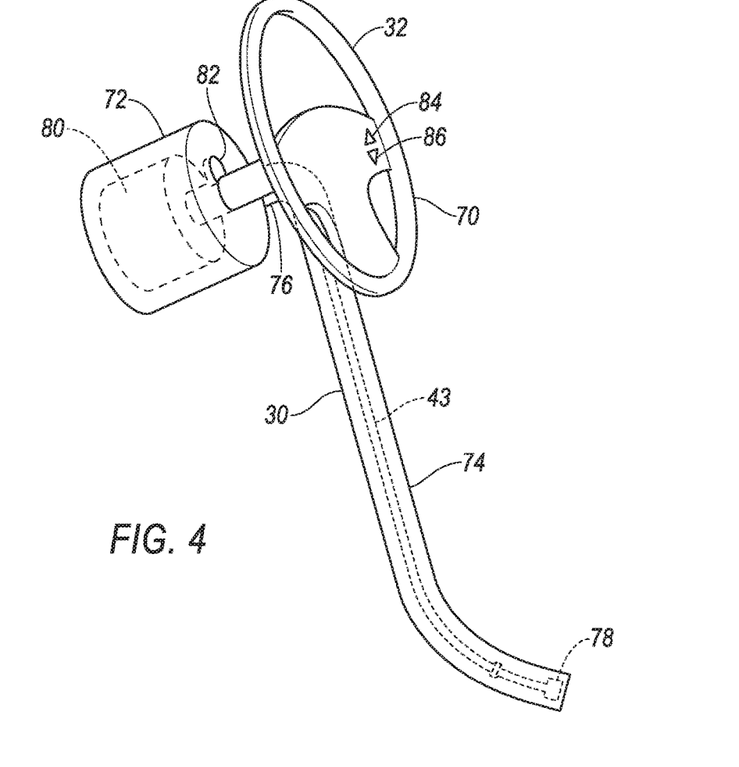
FIG. 4 is a perspective view of the steering assembly.
Figure 5:
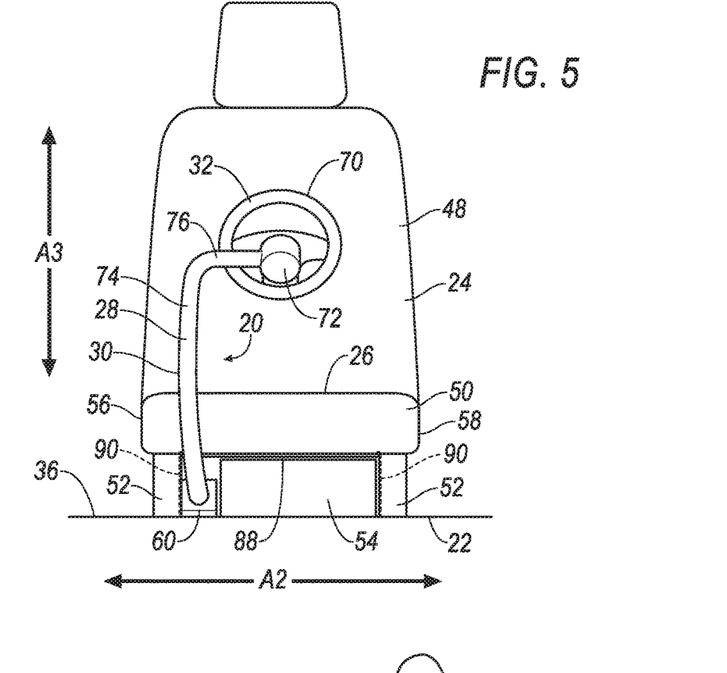
FIG. 5 is a front view of the steering assembly in the first position.

With reference to FIGS. 3 and 4, the steering system 42 may include an electrical connector 78. The electrical connector 78 is in communication with the vehicle computer 44, e.g., via an in-vehicle communication network 66. The electrical connector 78 connects the steering assembly 28 to the vehicle computer 44, e.g., by connecting with the electrical connector 64 of the receiver 60. The electrical connector 78 may include pins, sockets, conductive pads, etc. The electrical connector 78 may be designed to engage the electrical connector 64 of the receiver 60. For example, one or more pins of the electrical connector 78 may be sized to fit one or more sockets of the electrical connector 64 of the receiver 60, and vice versa.

With reference to FIG. 4, the head unit 72 supports and protects components of the steering assembly 28, e.g., the user interface(s) 32, a force feedback actuator 80, etc. The head unit 72 may be made of metal, plastic, or any suitable material. The head unit 72 is supported by the support shaft 30, e.g., the head unit 72 may be fixed to the second elongated portion 76, e.g., with fasteners, adhesives, etc. The head unit 72 and the support shaft 30, e.g., the second elongated portion 76 of the support shaft 30, may be monolithic.

The user interface 32 provides an input for an operator of the vehicle 22. The user interface 32 include buttons, paddles, nobs, touch panels, touch sensitives displays, etc. The user interface 32 may include chips, circuits, antenna, etc. Input to the one or more user interfaces 32 may cause the steering assembly 28 to send a command to the vehicle computer 44 to actuate the steering system 42, the propulsion system 38 and/or the brake system 40.

The user interface 32 may include a steering wheel 70. Rotation of the steering wheel 70 may cause the steering assembly 28 to send the command to the vehicle computer 44 to actuate the steering system 42, e.g., sensors 82 in the steering assembly 28 may detect a steering angle of the steering wheel 70 and transmit such position to the vehicle computer 44. The steering wheel 70 may be supported by the head unit 72. The steering wheel 70 may be releasably secured to the head unit 72, e.g., with a fastener, clip, etc. For example, the steering wheel 70 may be secured to the head unit 72 while the steering assembly 28 is in the first position, and the steering wheel 70 may be released from the head unit 72 while the steering assembly 28 is in the second position. The operator of the vehicle 22 may secure and release the steering wheel 70, e.g., by manipulating the fasteners, clips, etc.

The steering assembly 28, e.g., the user interface 32, may include a throttle control interface 84. The throttle control interface 84 may be a paddle, a button, a joystick, etc. The throttle control interface 84 receives input from the operator of the vehicle 22 and transmits a command the to the vehicle computer 44 to actuate the propulsion system 38. The throttle control interface 84 may be supported by the head unit 72, the steering wheel 70, etc.

The steering system 42, e.g., the user interface 32, may include a brake control interface 86. The brake control interface 86 may be a paddle, a button, a joystick, etc. The brake control interface 86 receives input from the operator of the vehicle 22 and transmits a command the to the vehicle computer 44 to actuate the brake system 40. The brake control interface 86 may be supported by the head unit 72, the steering wheel 70, etc.

The user interface 32 is in communication with the computer 44. The user interface 32 may communicate wirelessly with the computer 44, e.g., via Bluetooth, WIFI, etc. The user interface 32 may be in wired communication with the computer 44. For example, the steering system 42 may include a wiring harness 43. The wiring harness 43 includes one or more wires for transmitting electronic information. For example, the wiring harness 43 may be electrical wires, fiber optic cable, etc. The wiring harness 43 may connect the head unit 72, e.g., the user interface 32, the force feedback actuator 80, etc., to the electrical connector 64. The wiring harness 43 may be disposed in the support shaft 30, e.g., within the hollow of the first elongated portion 74 and/or the second elongated portion 76.

The force feedback actuator 80 provides feedback to the operator, e.g., by applying a force to the one or more user interfaces 32. For example, the force feedback actuator 80 may be a motor, e.g., a servo motor, coupled to the steering wheel 70. Actuation of the motor, e.g., in response to a command for the computer 44, may urge the steering wheel 70 to rotate. Additionally or alternately, the force feedback actuator 80 may include a linear actuator, a rack and pinion, a piston and cylinder, an electromagnet, etc., e.g., positioned to urge the pads, nobs, buttons, etc. of the user interface 32.

The steering assembly 28 in the first position is disposed in front of the seat 24, as shown in FIGS. 1, 3, 5, and 6. In the first position, the steering assembly 28 may be supported by the receiver 60, e.g., the first elongated portion 74 may engage the receiver 60. In the first position, the first elongated portion 74 may extend transverse to the longitudinal axis A1 and the vertical axis A3. To put it another way, in the first position, the first elongated portion 74 may extend upward and forward from the receiver 60 at the vehicle inboard side 56 of the seat 24. In the first position, the second elongated portion 76 extends along the lateral axis A2. To put it another way, in the first position, the second elongated portion 76 extends from the first elongated portion 74 at the vehicle inboard side 56 of the seat 24 towards the vehicle outboard side 58 of the seat 24. In the first position, the electrical connector 78 of the steering assembly 28 may be engaged with the electrical connector 64 of the receiver 60, e.g., providing electrical communication therebetween.

Figure 1:
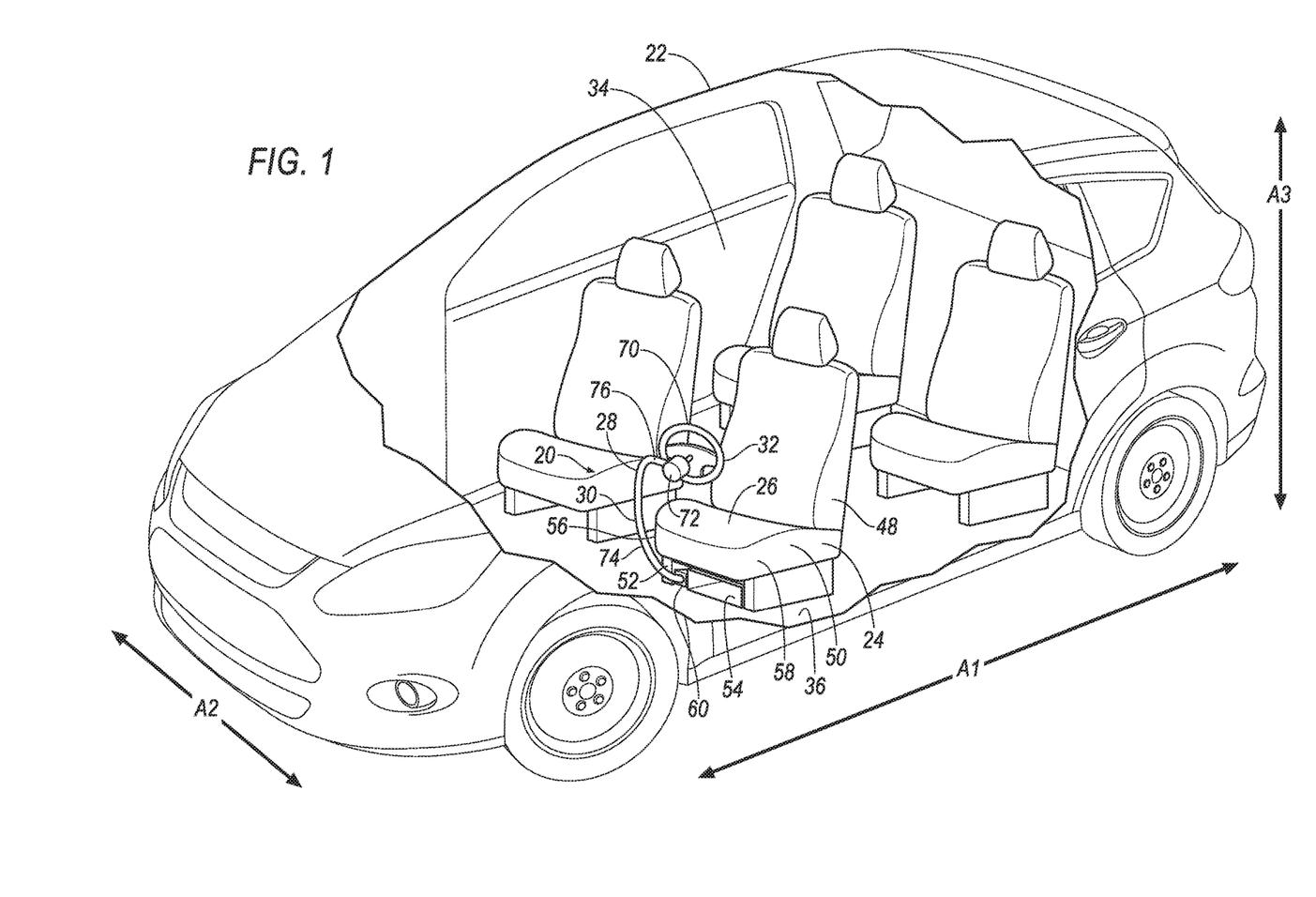
FIG. 1 is a perspective view of a vehicle with a steering assembly in a first position.
Figure 2:
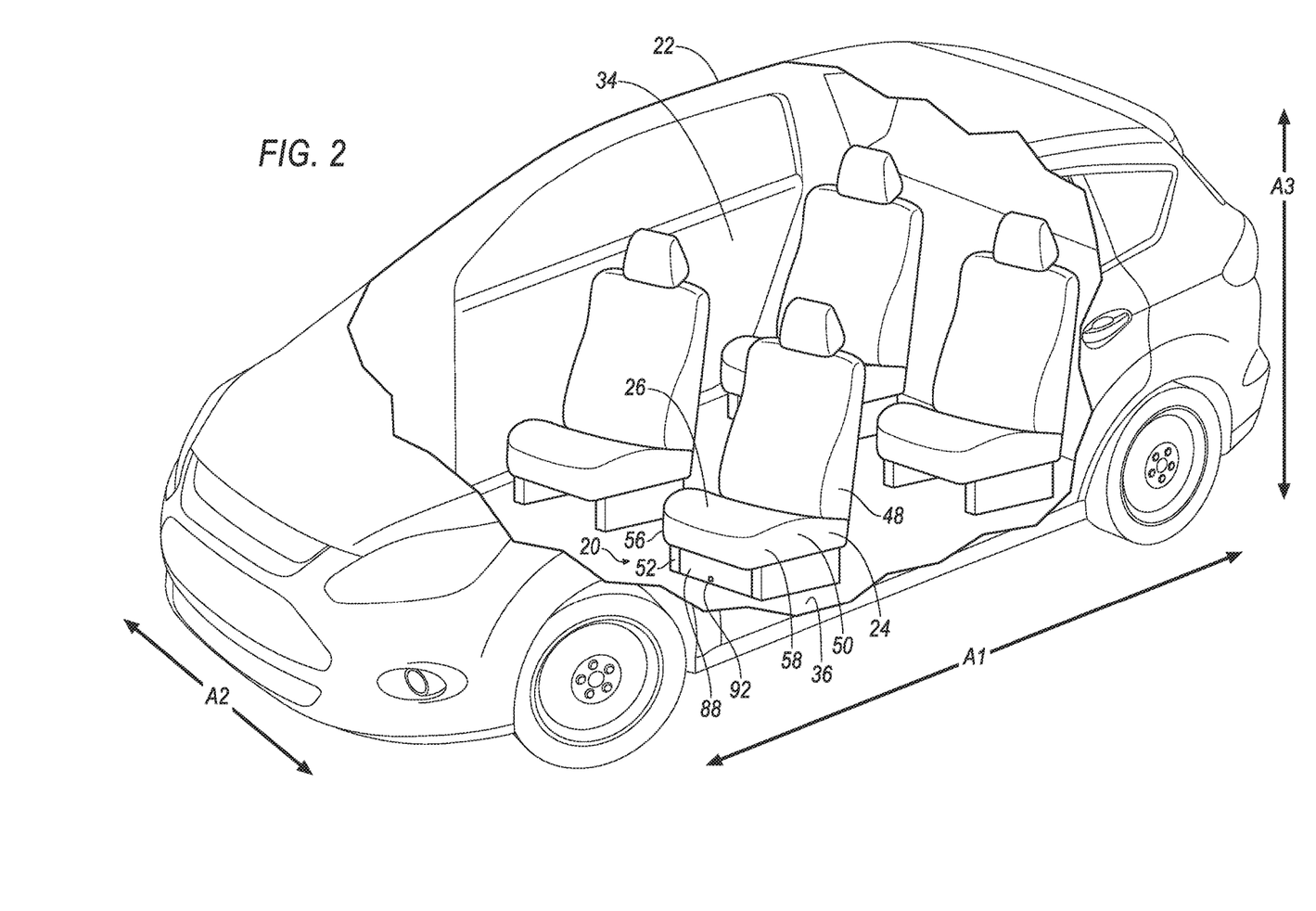
FIG. 2 is a perspective view of the vehicle with the steering assembly in a second position.
Figure 7:
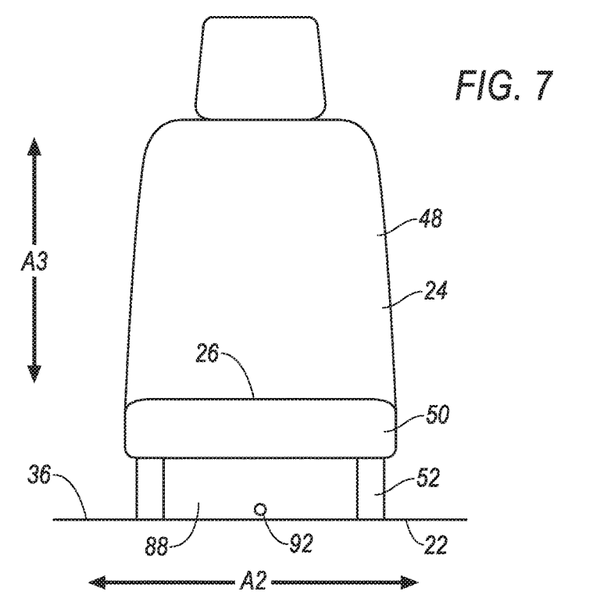
FIG. 7 is a front view of the steering assembly in the second position.

The steering assembly 28 in the second position is disposed below the seat 24, e.g., below the seating surface 26, as shown in FIGS. 2, 7, and 8. In the second position, the steering assembly 28 may be in the cavity 54 defined between the seat bottom 50 and the floor 36 of the vehicle 22. In the second position, the first elongated portion 74 may be disengaged from the receiver 60. The operator of the vehicle 22 may move the steering assembly 28 from the first position to the second position, and vice versa.

The system 20 may include a panel 88 positioned relative to the seat 24 and movable between a closed position and an open position. The panel 88 may be supported by the seat 24, e.g., by the seat 24 frame 52. The panel 88 may travel along a track 90 between the closed position and the open position. The operator may move the panel 88 between the closed position and the open position. Additionally or alternatively, the system 20 may include an actuator, e.g., a linear actuator, a rack and pinion, etc., positioned to move the panel 88 between the closed position and the open position, e.g., in response to a command from the computer 44.

In the closed position, the panel 88 inhibits the steering assembly 28 from moving from the second position to the first position. For example, the panel 88 in the closed position may be elongated along the lateral axis A2 and the vertical axis A3, and may be positioned to block access to the cavity 54. To put it another way, the panel 88 in the closed position may extend between the seat bottom 50 and the floor 36, and between the vehicle inboard side 56 of the seat 24 and the vehicle outboard side 58 of the seat 24.

In the open position, the panel 88 permits the steering assembly 28 to move from the second position to the first position. For example, the panel 88 in the open position may be elongated along the lateral axis A2 and the longitudinal axis A1, and may be positioned to allow access to the cavity 54. To put it another way, the panel 88 may be elongated along the seat bottom 50, e.g., adjacent the seat bottom 50 and at a top of the cavity 54.

The system 20 may include a lock 92, as shown in FIG. 8. The lock 92 is moveable between a locked state in which the panel 88 is inhibited from moving from the closed position to the open position and an unlocked state in which the panel 88 is permitted to move from the closed position to the open position. For example, the lock 92 may be secured to the panel 88 and may include a latch that engages the floor 36, e.g., a slot in the floor 36, in the locked state. Additional or alternative features may be included in the lock 92 to provide the locked and unlocked states. The lock 92 may include circuits, chips, actuators, etc., designed to move the lock 92 from the locked state to the unlocked state, e.g., in response to a command from the computer 44. The lock 92 may transmit a message to the computer 44 indicating whether the lock 92 is in the locked state or the unlocked state.

With reference to FIG. 9, the propulsion system 38 of the vehicle 22 can translate stored energy into motion of the vehicle 22. The propulsion system 38 may be an electric powertrain including batteries, an electric motor, and a transmission that transfers rotational motion to the wheels; a hybrid powertrain including elements of a conventional powertrain, e.g., an internal-combustion engine coupled to a transmission that transfers rotational motion to wheels, and the electric powertrain; or any other type of propulsion that utilizes stored electric power. The propulsion system 38 is in communication with and receives input from the vehicle computer 44 and/or from a human driver. The human driver may control the propulsion system 38 via an input device, e.g., the throttle control interface 84.

The brake system 40 can be a conventional vehicle subsystem that can resist the motion of the vehicle 22 to slow and/or stop the vehicle 22. The brake system 40 may be friction brakes such as disc brakes, drum brakes, band brakes, etc.; regenerative brakes; a parking brake; any other suitable type of brakes; or a combination. The brake system 40 can include an electronic control unit (ECU) or the like that actuates the brake system 40 to resist the motion of the vehicle 22. e.g., in response to a command from the vehicle computer 44 and/or from a human driver. The human driver may control the brake system 40 via an input device, e.g., the brake control interface 86.

The steering system 42 can be a conventional vehicle steering subsystem and controls the turning of the wheels. The steering system 42 is in communication with and receives input from the steering wheel 70 and/or the vehicle computer 44. The steering system 42 may be a rack-and-pinion system with electric power-assisted steering, a steer-by-wire system, as are both known in the art, or any other suitable system.

Sensors 82 may detect internal states of the vehicle 22. For example, wheel speed, wheel orientation, tire pressure, suspension travel, brake sensors, traction control sensors, and engine and transmission variables. The sensors 82 may detect the position or orientation of the vehicle 22. For example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 82 may detect the external world. For example, light measurement sensors, photometers, microphones, wind speed measurement sensors, radar sensors, scanning laser range finders, light detection and ranging (LIDAR) devices, and image processing sensors such as cameras. The sensors 82 may detect the position of the steering assembly 28, e.g., a proximity sensor 82p may be supported by the receiver 60 and positioned to detect when the steering assembly 28 is engaged with the receiver 60, as shown in FIG. 3. The sensors 82 may detect the position of the panel 88, e.g., one or more proximity sensors 82p may be supported by the track 90 and positioned to detect the position of the panel 88, etc.

The in-vehicle communication network 66, shown in FIG. 9, includes hardware such as a communication bus, for facilitating communication among vehicle components. The in-vehicle communication network 66 may facilitate wired or wireless communication among the vehicle components in accordance with a number of communication protocols such as controller area network (CAN), Ethernet, WiFi, Local Interconnect Network (LIN), and/or other wired or wireless mechanisms.

The vehicle computer 44, implemented via circuits, chips, antennas and/or other electronic components, is included in the vehicle 22 for carrying out various operations and processes, including those described herein. The vehicle computer 44 is a computing device that generally includes a processor and a memory, the memory including one or more forms of computer-readable media, and storing instructions executable by the processor for performing various operations and processes, including those disclosed herein. The vehicle computer 44 may be programmed by storing instructions on the memory that are executable by the processor.

The memory of the vehicle computer 44 further generally stores remote data received via various communications mechanisms; e.g., the vehicle computer 44 is generally configured for communications with vehicle components on the in-vehicle communication network 66. e.g., a controller area network (CAN) bus, and for using other wired or wireless protocols to communicate with devices outside the vehicle 22, e.g., with a user device 94, e.g., Universal Serial Bus (USB), Bluetooth®, IEEE 802.11 (colloquially referred to as WiFi®), satellite telecommunication protocols, and cellular protocols such as 3G, LTE, etc. Via the in-vehicle communication network 66 the vehicle computer 44 may transmit messages to various devices in the vehicle 22 and/or receive messages from the various devices, e.g., the propulsion system 38, the brake system 40, the steering system 42, the sensors 82, etc., e.g., as discussed herein. Although one vehicle computer 44 is shown for ease of illustration, it is to be understood that the vehicle computer 44 could include, and various operations described herein could be carried out by, one or more computing devices.

The vehicle computer 44 may be programmed to actuate the lock 68 and/or the lock 92. For example, the computer 44 may transmit commands to the lock 68 and/or the lock 92, e.g., via the in-vehicle communication network 66, instructing actuation of the lock 68 and/or the lock 92 to the locked state or the unlocked state.

The computer 44 may actuate the lock 92 from the locked state to the unlocked state, e.g., to permit the panel 88 to move to the open position and provide access to the steering assembly 28 in the second position, upon receiving a request to operate the vehicle 22 in the manual mode. The request to operate the vehicle 22 in the manual mode may be received from the vehicle user interface 46, the user device 94, etc.

The computer 44 may actuate the lock 68 to the locked state before operating the vehicle 22 in the manual mode, e.g., to prevent the steering assembly 28 from disengaging from the receiver 60 while the vehicle 22 is in the manual mode. The vehicle computer 44 may operate the vehicle 22 in the manual mode upon detecting that the steering assembly 28 is in the first position, e.g., based on information from the sensors 82.

The computer 44 may be programmed to actuate the vehicle steering system 42, the propulsion system 38, and/or the brake system 40 in response to a command from the steering assembly 28. For example, the computer 44 may receive a command from the user interface 32, e.g., the steering wheel 70, the throttle control interface 84, the brake control interface 86, e.g., via the in-vehicle communication network 66. Based on such command, the computer 44 may transmit a command instructing actuation to the propulsion system 38, the braking system 40, and/or the steering system 42, e.g., via the in-vehicle communication network 66.

The user device 94 may be any one of a variety of computing devices including a processor, a memory, an antenna, e.g., a smartphone, a tablet, a personal digital assistant, etc., the user device 94 may wirelessly communicate with the vehicle computer 44.

The adjectives "first" and "second" are used throughout this document as identifiers and are not intended to signify importance or order.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
   a seat; and
   a steering assembly including a support shaft and a user interface, the steering assembly movable between a first position and a second position;
   a receiver located under the seat;
   wherein the steering assembly is disposed in front of the seat and engaged with the receiver in the first position, and the steering assembly is below the seat and disengaged from the receiver in the second position.

2. The system of claim 1, further comprising a panel positioned relative to the seat and movable between a closed position in which the steering assembly is inhibited from moving from the second position to the first position and an open position in which the steering assembly is permitted to move from the second position to the first position.

3. The system of claim 2, further comprising a lock moveable between a locked state in which the panel is inhibited from moving from the closed position to the open position and an unlocked state in which the panel is permitted to move from the closed position to the open position.

4. The system of claim 3, further comprising a processor and a memory, the memory storing instructions executable by the processor to actuate the lock from the locked state to the unlocked state upon receiving a request to operate a vehicle in a manual mode.

5. The system of claim 1, wherein the receiver is located at a vehicle inboard side of the seat.

6. The system of claim 1, wherein the receiver is in electrical communication with the steering assembly in the first position.

7. The system of claim 1, wherein the seat includes a seat frame, and the receiver is supported by the seat frame.

8. The system of claim 1, further comprising a lock moveable between a locked state in which disengagement of the steering assembly from the receiver is inhibited and an unlocked state in which disengagement of the steering assembly from the receiver is permitted.

9. The system of claim 8, further comprising a processor and a memory, the memory storing instructions executable by the processor to actuate the lock of the receiver to the locked state before operating a vehicle in a manual mode.

10. The system of claim 1, further comprising a processor and a memory, the memory storing instructions executable by the processor to operate a vehicle in a manual mode upon detecting that the steering assembly is in the first position.

11. The system of claim 1, further comprising a processor in wireless communication with the steering assembly, and a memory storing instructions executable by the processor to actuate a vehicle steering system in response to a command from the steering assembly.

12. The system of claim 1, wherein the steering assembly includes a steering wheel and a sensor positioned to detect a steering angle of the steering wheel.

13. The system of claim 1, wherein the steering assembly includes a steering wheel and a force feedback actuator coupled to the steering wheel.

14. The system of claim 1, wherein the steering assembly includes a wiring harness disposed in the support shaft.

15. The system of claim 1, wherein the steering assembly includes a throttle control interface.

16. The system of claim 1, wherein the steering assembly includes a brake control interface.

17. The system of claim 1, wherein the steering assembly includes a head unit supported by the support shaft, and a steering wheel supported by the head unit.

18. The system of claim 17, wherein the steering wheel is releasably secured to the head unit.

19. A system comprising:
    a seat; and
    a steering assembly including a support shaft and a user interface, the steering assembly movable between a first position and a second position, the steering assembly disposed in front of the seat in the first position and below the seat in the second position; and
    a processor and a memory, the memory storing instructions executable by the processor to operate a vehicle in a manual mode upon detecting that the steering assembly is in the first position.

20. A system comprising:
    a seat; and
    a steering assembly including a support shaft and a user interface, the steering assembly movable between a first position and a second position, the steering assembly disposed in front of the seat in the first position and below the seat in the second position; and
    wherein the support shaft includes a first elongated portion and a second elongated portion, and in the first position the first elongated portion extends transverse to a longitudinal axis and a vertical axis and the second elongated portion extends along a lateral axis.

* * * * *